US012639574B2

(12) United States Patent
Miki et al.

(10) Patent No.: US 12,639,574 B2
(45) Date of Patent: May 26, 2026

(54) INFORMATION PROCESSING APPARATUS AND METHOD AND PROGRAM FOR IDENTIFYING COADAPTED NODES

(71) Applicant: DENSO CORPORATION, Kariya-city (JP)

(72) Inventors: Akira Miki, Kariya-city (JP); Tadashi Kadowaki, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 1022 days.

(21) Appl. No.: 17/211,270

(22) Filed: Mar. 24, 2021

(65) Prior Publication Data

US 2021/0304046 A1 Sep. 30, 2021

(30) Foreign Application Priority Data

Mar. 26, 2020 (JP) ................................. 2020-055576

(51) Int. Cl.
*G06N 3/082* (2023.01)
*G06F 18/20* (2023.01)
*G06F 18/211* (2023.01)
*G06N 7/01* (2023.01)

(52) U.S. Cl.
CPC ........... *G06N 3/082* (2013.01); *G06F 18/211* (2023.01); *G06F 18/285* (2023.01); *G06N 7/01* (2023.01)

(58) Field of Classification Search
CPC ........ G06N 3/082; G06N 7/01; G06F 18/211; G06F 18/285
See application file for complete search history.

(56) References Cited

U.S. PATENT DOCUMENTS 10,095,981 B1 * 10/2018 Garrison ................... G06N 5/01
10,380,484 B2 8/2019 Goel et al.
(Continued)

FOREIGN PATENT DOCUMENTS

| JP | H09-091263 A | 4/1997 |
| JP | 2005-346714 A | 12/2005 |
| JP | 2019-133628 A | 8/2019 |

(Continued)

OTHER PUBLICATIONS

DuttaA (https://datascience.stackexchange.com/users/47832/duttaa), What is coadaptation of neurons in neural networks?, URL (version: Jul. 27, 2018): https://datascience.stackexchange.com/q/36064 (Year: 2018).*
(Continued)

*Primary Examiner* — Kamran Afshar
*Assistant Examiner* — Simon Fischer Ellis
(74) *Attorney, Agent, or Firm* — Precision Patents, P.C.

(57) ABSTRACT

In an information processing apparatus, a selection unit selects, from a plurality of nodes that constitute a trained model, one or more nodes that are to be dropped out from the trained model as one or more dropout nodes. The trained model is configured to output, in response to input information being input thereto, output information. An identifier is configured to identify, in the plurality of nodes that constitute the trained model, one or more relatively coadapted nodes in accordance with an appropriateness of the trained model from which the one or more dropout nodes have been dropped out.

17 Claims, 5 Drawing Sheets

(56) References Cited

U.S. PATENT DOCUMENTS

2017/0039472 A1\*  2/2017  Kudo ..................... G06N 3/063
2021/0124988 A1   4/2021  Kadowaki

FOREIGN PATENT DOCUMENTS

JP        2019194962    * 10/2019
KR      20200127091 A  * 11/2020
WO      2017/131081 A1   8/2017

OTHER PUBLICATIONS

Hinton, Geoffrey E., Nitish Srivastava, Alex Krizhevsky, Ilya Sutskever, and Ruslan R. Salakhutdinov. "Improving neural networks by preventing co-adaptation of feature detectors." arXiv preprint arXiv:1207.0580 (2012). (Year: 2012).\*
Helmbold, David P., and Philip M. Long. "Surprising properties of dropout in deep networks." Journal of Machine Learning Research 18, No. 200 (2018): 1-28. (Year: 2018).\*
LeCun, Yann et al. (1999). Object Recognition with Gradient-Based Learning. In: Shape, Contour and Grouping in Computer Vision. Lecture Notes in Computer Science, vol. 1681. Springer, Berlin, Heidelberg. https://doi.org/10.1007/3-540-46805-6_19.
Keshari et al., Guided Dropout, Association for the Advancement of Artificial Intelligence, www.aaai.org, Dec. 10, 2018, 8 pgs.
Yeom et al., Pruning by Explaining: A Novel Criterion for Deep Neural Network Pruning, Dec. 18, 2019, 24 pgs.

\* cited by examiner

|  | $N_{11}$ | $N_{12}$ | $N_{13}$ | $\cdots$ | $N_{21}$ | $N_{22}$ | $N_{23}$ | $\cdots$ | $N_{31}$ | $N_{32}$ | $N_{33}$ | $\cdots$ |  |
|---|---|---|---|---|---|---|---|---|---|---|---|---|---|
| $Sc_1$ | 1 | 0 | 1 | $\cdots$ | 0 | 0 | 0 | $\cdots$ | 0 | 0 | 0 | $\cdots$ | $z_1$ |
| $Sc_2$ | 0 | 1 | 0 | $\cdots$ | 0 | 0 | 0 | $\cdots$ | 0 | 0 | 0 | $\cdots$ | $z_2$ |
| $Sc_3$ | 1 | 1 | 0 | $\cdots$ | 0 | 0 | 0 | $\cdots$ | 0 | 0 | 0 | $\cdots$ | $z_3$ |

$$\underbrace{\qquad\qquad\qquad\qquad\qquad}_{S} \quad \underbrace{\ }_{Z}$$

THE NUMBER OF DATA ITEMS
A > B > C

INFORMATION PROCESSING APPARATUS AND METHOD AND PROGRAM FOR IDENTIFYING COADAPTED NODES

CROSS REFERENCE TO RELATED APPLICATION

This application is based on and claims the benefit of priority from Japanese Patent Application No. 2020-055576 filed on Mar. 26, 2020, and the disclosure of which is incorporated in its entirety herein by reference.

TECHNICAL FIELD

The present disclosure relates to information processing apparatuses, and methods and programs for identifying one or more coadapted nodes.

BACKGROUND

Machine learning using, for example, a neural network as a learning model has been widely performed in recent years.

Such a neural network is comprised of an input layer, an output layer, and one or more nodes arranged between the input layer and the output layer; the one or more nodes are also called neurons or filters.

For example, Japanese Patent Application Publication No. 2005-346714 discloses that learning models, such as neural network models, are called black-box models. Black box models usually have no physical or chemical meaning of each parameter used thereby. This may therefore make it difficult for users to understand why and how a used learning model derives a desirable output, and to link the learning model with physical inputs and/or chemical inputs.

SUMMARY

Unfortunately, the internal structures of black-box models may be harder to understand. Some users would like to use white-box models, which enable the users to understand information about the internal structures of the white-box models.

In view of the circumstances set forth above, an exemplary aspect of the present disclosure seeks to provide information processing apparatuses and methods and programs for identifying coadapted nodes, each of which is capable of elucidating a black-box model to a white-box model.

Note that a white-box model is for example defined such that one or more coadapted nodes in a trained model, which is a learning model with predetermined model parameters, can be identified, i.e., opened.

An information processing apparatus according to a first aspect of the present disclosure includes a selection unit configured to select, from a plurality of nodes that constitute a trained model, one or more nodes that are to be dropped out from the trained model as one or more dropout nodes. The trained model is configured to output, in response to input information being input thereto, output information. The information processing apparatus includes an identifier configured to identify, in the plurality of nodes that constitute the trained model, one or more relatively coadapted nodes in accordance with an appropriateness of a dropout model in which the one or more dropout nodes have been dropped out from the trained model.

A computer-implemented coadapted-node identification method according to a second aspect of the present disclosure includes (i) Selecting, from a plurality of nodes that constitute a trained model, one or more nodes that are to be dropped out from the trained model as one or more dropout nodes, the trained model being configured to output, in response to input information being input thereto, output information (ii) Identifying, in the plurality of nodes that constitute the trained model, one or more relatively coadapted nodes in accordance with an appropriateness of the trained model from which the one or more dropout nodes have been dropped out A computer-readable program product according to a third aspect of the present disclosure includes a non-transitory computer-readable storage medium, and a set of computer program instructions stored in the computer-readable storage medium. The instructions causes a computer to (I) Select, from a plurality of nodes that constitute a trained model, one or more nodes that are to be dropped out from the trained model as one or more dropout nodes, the trained model being configured to output, in response to input information being input thereto, output information (II) Identify, in the plurality of nodes that constitute the trained model, one or more relatively coadapted nodes in accordance with an appropriateness of the trained model from which the one or more dropout nodes have been dropped out As described above, each of the first to third aspects of the present disclosure identifies, in the plurality of nodes that constitute the trained model, one or more relatively coadapted nodes. This enables the trained model to be elucidated as a white-box model.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings. In the exemplary embodiment and its modifications, like parts between the exemplary embodiment and its modifications may be omitted or simplified to avoid 10) redundant description.

Figure 1:
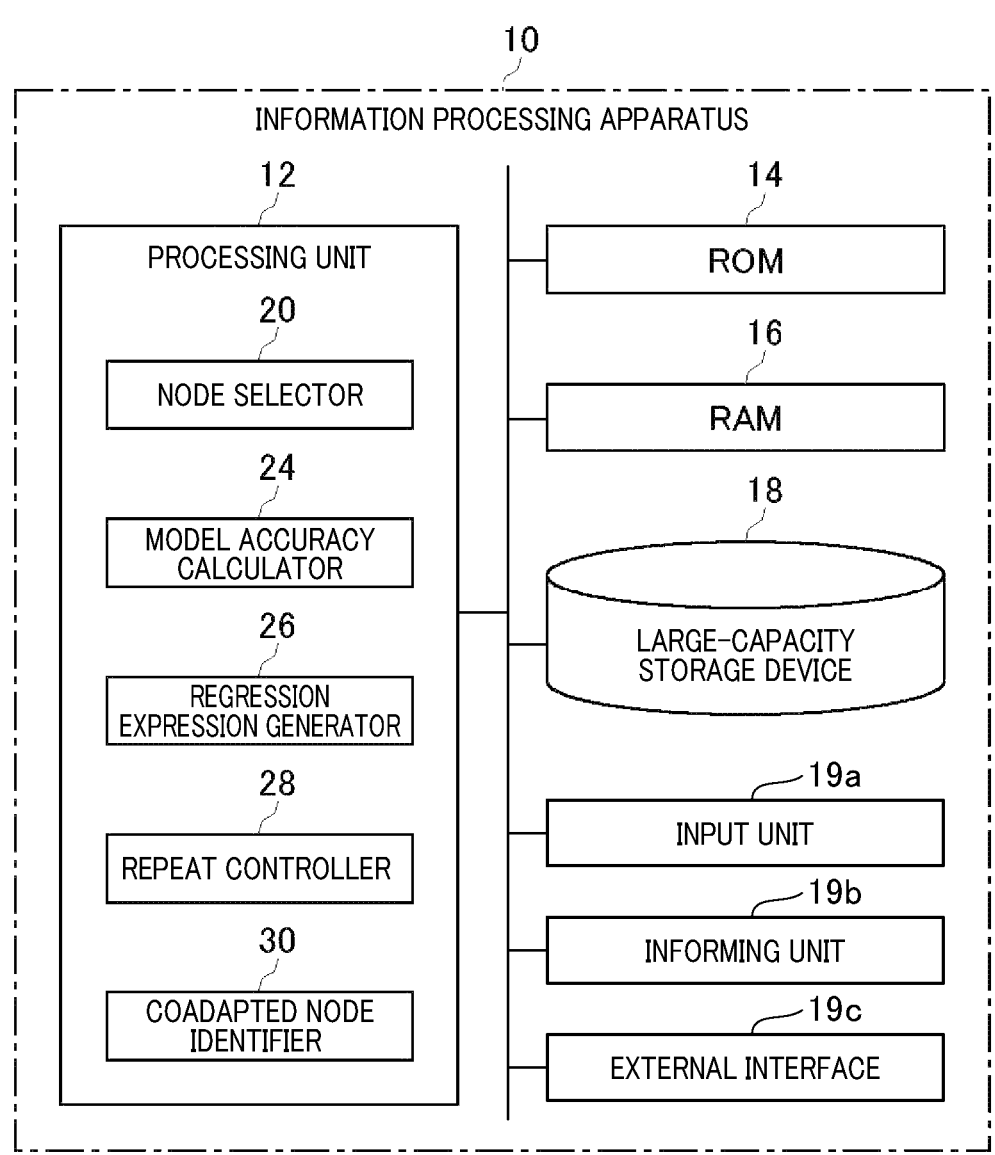
FIG. 1 is a block diagram schematically illustrating an example of the schematic structure of an information processing apparatus according to an exemplary embodiment of the present disclosure.

FIG. 1 is a block diagram schematically illustrating an example of the structure of an information processing apparatus 10 according to the exemplary embodiment of the present disclosure.

Referring to FIG. 1, the information processing apparatus 10 of the exemplary embodiment includes a processing unit 12 comprised of, for example, one or more quantum computers, in other words, quantum processors. The information processing apparatus 10 also includes, for example, a read only memory (ROM) 14, a random-access memory (RAM) 16, and a large-capacity storage device 18. These devices 14, 16, and 18 are communicably connected to the processing unit 12.

The ROM 12 has stored various programs and various pieces of data. The RAM 14 serves as a working area where the processing unit 12 executes the various programs. The large-capacity storage device 18 has stored, for example, various algorithms, i.e. algorithm programs, and various datasets.

A quantum computer, which can constitute the processing unit 12, uses quantum bits to perform various computing operations, such as calculations; the quantum bits are each defined as an information unit based on one or more materials that have quantum mechanical behaviors. Any classical computer, which uses classical bits respectively representing information units, can constitute the processing unit 12; the classical bits can be each implemented by, for example, one or more CMOS transistors. One or more quantum computers and one or more classical computers can constitute the processing unit 12. That is, a part of the functions or all of the functions of the processing unit 12 of the information processing apparatus 10 can be implemented by at least one quantum computer.

The large-capacity storage device 18 has stored (i) a trained model 50, which has been trained, constituting, for example, a neural network described hereinafter and (ii) at least one program that causes the processing unit 12 to perform a coadapted-node identifying routine, which will be described later. Note that the processing unit 12 can have a function of regularly training the trained model using datasets stored in, for example, the large-capacity storage device 18.

The large-capacity storage device 18 can be comprised of, for example, a hard-disk drive (HDD), a semiconductor storage device, or another type of storage device.

A trained model used in the exemplary embodiment and stored in the large-capacity storage device 18 represents, for example, a data structure that is comprised of a functional form of an activation function and model parameters. The trained model for example describes an observed or a predicted behavior of a selected target system, and is configured to output data in response to input data being inputted thereto.

The information processing apparatus 10 additionally includes an input unit 19a, an informing unit 19b, and an external interface 19c; these units 19a to 19c are communicably connected to the processing unit 12.

The input unit 19a is comprised of at least one input device, such as a touch panel, plural buttons, a keyboard, a mouse, and/or a pointing device. The input unit 19a enables users to operate the at least one input device to enter various information items, receives the entered information items, and sends the received information items to the processing unit 12.

The informing unit 19b includes, for example, a display and/or a speaker. The informing unit 19b is configured to provide, to users, visible and/or audible information through the display and/or speaker.

The external interface 19c is communicably connected with external apparatuses, such as other external information processing apparatuses. The external interface 19c enables the processing unit 12 to communicate various data items with the external apparatuses therethrough.

Figure 2:
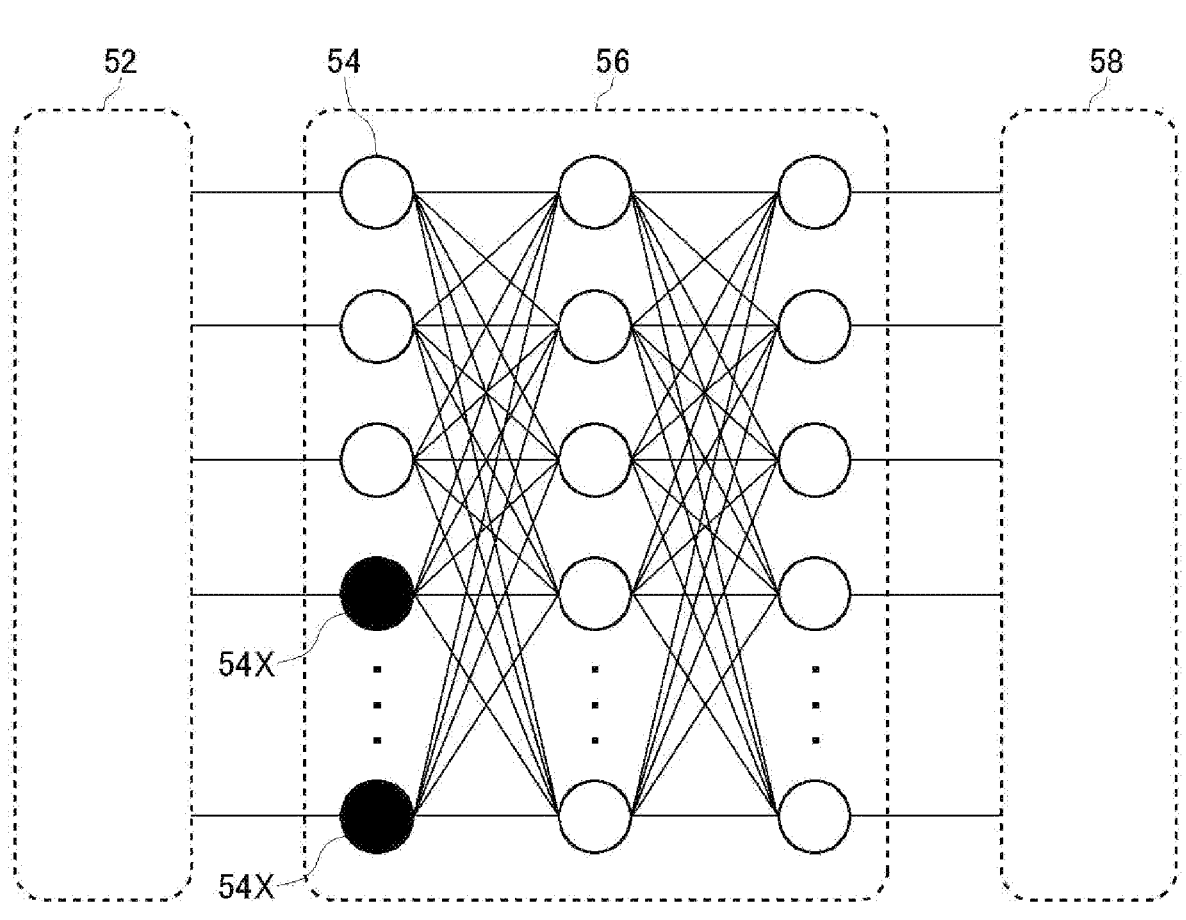
FIG. 2 is a diagram schematically illustrating a neural network as an example of a trained model according to the exemplary embodiment.

FIG. 2 schematically illustrates a neural network, which is an example of the trained model 50 stored in the large-capacity storage device 18; the neural network is configured to generate output information in response to input information being input thereto.

For example, the neural network includes an input layer 52, intermediate layers (hidden layers) 56 comprised of plural nodes 54, and an output layer 58. Each node, which can be referred to as unit or neuron, serves as, for example, a functional module, such as a hardware module, a software module, or the combination of hardware and software modules.

The input layer 52 is configured to receive input information inputted thereto, and output the input information to the intermediate layers 56. The input layer 52 can be configured to perform a predetermined process on the input information, and thereafter output the input information that has been processed to the intermediate layers 56.

Referring to FIG. 2, the intermediate layers 56 are comprised of, for example, first to third layers aligned in this order in the direction from the input layer 52 to the output layer 58.

Each of the first to third layers of the intermediate layers 56 is comprised of a predetermined number of nodes 54, which are illustrated by white circles in FIG. 2. Each node 54 in the first layer, which is connected to the input layer 52, is connected to all nodes 54 in the second layer. Each node 54 in the second layer is connected to all nodes 54 in the third layer. Each node 54 in the third layer is connected to the output layer 58.

Each node in the first layer receives a corresponding item of the input information outputted from the input layer 52, and multiplies the received input information item by weight parameters determined for the respective nodes 54 in the second layer to accordingly generate output information items for the respective nodes 54 in the second layer. Then, each node 54 in the first layer outputs the generated output information items to the respective nodes 54 in the second layer.

Each node 54 in the second layer receives the output information items outputted from all the nodes 54 in the first layer, and calculates the sum of the received output information items to obtain an output value. Then, each node 54 in the second layer multiplies the output value by weight parameters determined for the respective nodes 54 in the third layer to accordingly generate output values for the respective nodes 54 in the third layer. Then, each node 54 in the second layer outputs the generated output values to the respective nodes 54 in the third layer.

Each node 54 in the third layer receives the output values outputted from all the nodes 54 in the second layer, and calculates the sum of the received output values to obtain an output value. Then, each node 54 in the third layer multiplies the obtained output value by a corresponding weight parameter to accordingly generate an output value. Then, each node 54 in the third layer outputs the generated output value to the output layer 58.

The output layer 58 is configured to receive the output value outputted from each node 54 in the third layer, and output the received output values as output information. The output layer 58 can be configured to perform a predetermined process on the received output values, and thereafter output the output values that has been processed.

Note that the trained model 50 used in the first embodiment is specially configured such that the intermediate layers 56 are comprised of plural nodes 54, and therefore the number of nodes 54 used in the trained model 50 can be freely determined. Similarly, the number of layers included in the trained model 50 and the number of layers in the intermediate layers 56 can be freely determined.

Additionally, the number of input information items to be inputted to the input layer 52 can be freely determined, and the type of the input information items, such as image information or sound information, to be inputted to the input layer 52 can be freely determined. The number of output information items to be outputted from the output layer 58 can be freely determined.

The trained model 50, such as a neural network model, is typically designed as a black-box model in which users cannot understand how output information items outputted from the black-box model are linked with input information items. Some users however would like to use white-box model, which enables users to identify one or more coadapted nodes 54 in the intermediate layers 56. The trained model 50, which has been elucidated as a white-box model, enables users to link input-output relationships of the trained model 50 with the one or more coadapted nodes 54, in other words, link information about how the trained model 50 works with the one or more coadapted nodes 54.

From the above viewpoint, the information processing apparatus 10 according to the exemplary embodiment is configured to select, from the nodes 54, nodes to be dropped out therefrom, and calculate an appropriateness of the trained model 50 from which the selected node has been dropped out, i.e., removed.

The information processing apparatus 10 is additionally configured to determine whether the trained model 50 from which the selected nodes have been dropped out is appropriate as a function of the calculated appropriateness of the trained model 50 from which the selected node has been dropped out.

In response to determination that the trained model 50 from which the selected nodes 54 have been dropped out is appropriate, the information processing apparatus 10 determines that the selected nodes 54 that have been dropped out from the trained model 50 are not-coadapted nodes with a relatively lower importance in the trained model 50.

In contrast, in response to determination that the trained model 50 from which the selected nodes 54 have been dropped out is inappropriate, the information processing apparatus 10 determines that the selected nodes 54 that have been dropped out from the trained model 50 are coadapted nodes with a relatively higher importance in the trained model 50.

Hereinafter, the trained model 50 from which no nodes have been dropped out will also be referred to as an original model 50.

In particular, the information processing apparatus 10 for example calculates, as an appropriateness of the trained model 50 from which selected nodes have been dropped out, an accuracy of the trained model 50 from which selected nodes have been dropped out. How the information processing apparatus 10 calculates an accuracy of the trained model 50 from which selected nodes have been dropped out will be described in detail later.

Note that the appropriateness of the trained model 50 from which a selected nodes have been dropped out is a metric used to evaluate whether the trained model 50 from which selected nodes have been dropped out is appropriate. Although the accuracy of the trained model 50 from which selected nodes have been dropped out is used as an example of the metric used to evaluate whether the corresponding trained model 50 is appropriate, another metric of the corresponding trained model 50, which is used to evaluate the corresponding trained model 50, can be used.

Next, the following describes nodes 54 dropped out from the trained model 50 with reference to FIG. 2.

In FIG. 2, filled black circles in the nodes (white circles) 54 in the intermediate layers 56 for example represent selected nodes to be dropped out from the intermediate layers 56; these nodes to be dropped out from the intermediate layers 56 will also be referred to as dropout nodes to each of which a reference numeral 54X is assigned. The dropout nodes 54X have no contribute to obtaining output information items based on the trained model 50 in response to input information items. An accuracy of the trained model 50 from which at least one selected node 54X has been dropped out is lower than that of the original model 50.

The following describes an example of a decrease in the accuracy of the trained model 50 from which one or more selected nodes 54X have been dropped out.

Let us assume that, in this example, a prepared number of image data frames, each of which shows the face of a corresponding driver who is driving a vehicle, are used as input information to be inputted to the trained model 50. In addition, let us assume that the trained model 50 outputs, in response to an image data frame being input thereto, output information indicative of the corresponding driver's drowsiness. For each of the prepared image data frames, a truth data item indicative of the corresponding driver's drowsiness has been determined to be paired to the corresponding one of the prepared image data frames.

Each node 54 in the trained model 50 works as a filter with a predetermined corresponding filtering function of the inputted image data frames.

Additionally, let us assume that a drowsiness prediction accuracy of the original model 50 when the prepared image data frames are input thereto is 99%. The drowsiness prediction accuracy of the original model 50 when the prepared image data frames are input thereto represents a percentage of agreement between the prepared image data frames and the respective truth data items.

If a first node 54 is selected to be dropped out from the intermediate layers 56 of the original model 50, a drowsiness prediction accuracy of the trained model 50 from which the selected first node 54 has been dropped out is changed from 99% to, for example, 85%.

In addition, if another node 54, i.e. a second node 54, is selected to be dropped out from the intermediate layers 56 of the original model 50, a drowsiness prediction accuracy of the trained model 50 from which the selected second node 54 has been dropped out is changed from 99% to, for example, 95%.

This makes it possible for the information processing apparatus 10 to determine that the first node 54, which causes the drowsiness prediction accuracy to be lower than the second node 54 does, is a coadapted node with a relatively higher importance than the second node.

That is, one or more coadapted nodes in the trained model 50 have a higher impact on output information outputted from the trained model 50, in other words, one or more coadapted nodes in the trained model 50 enable the internal structure of the trained model 50 to be understood.

Figure 3:
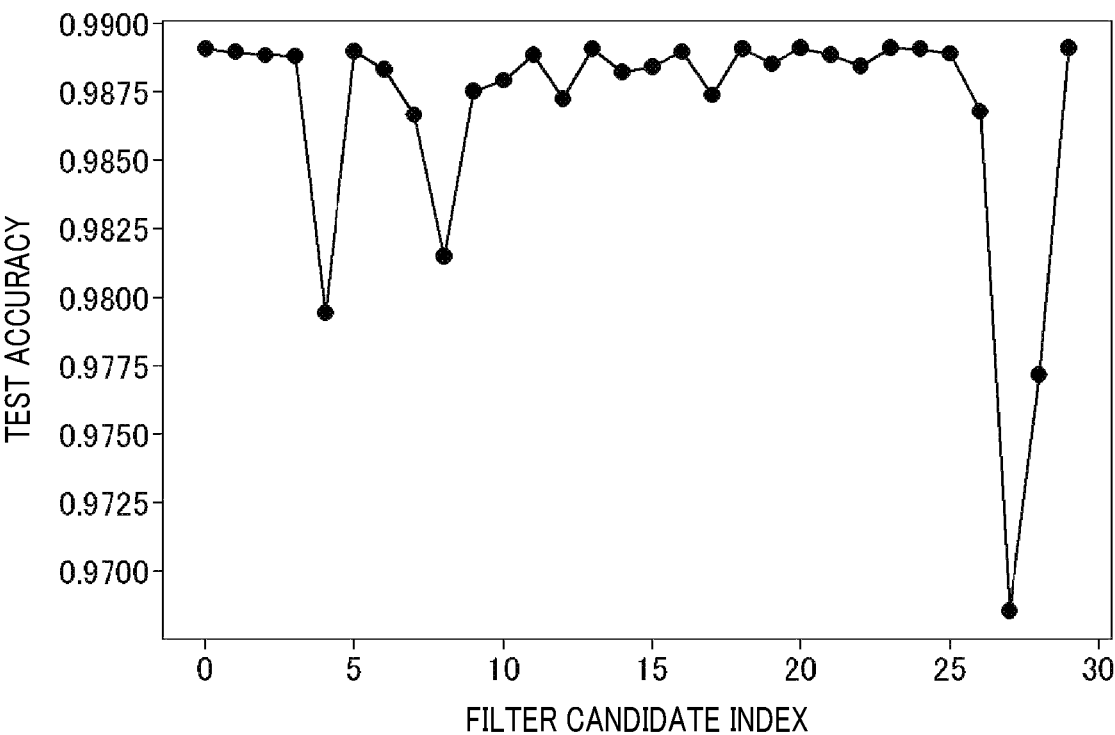
FIG. 3 is a graph schematically illustrating results of a first test that tested the prediction accuracy of the trained model from which a selected one node had been dropped out.
Figure 4:
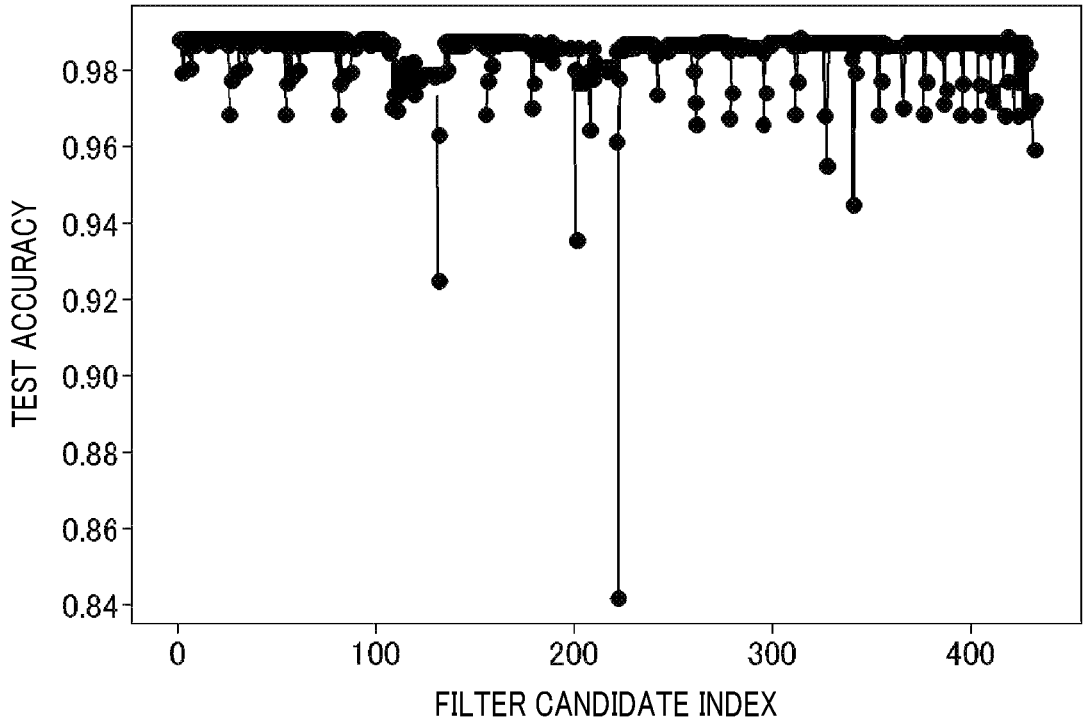
FIG. 4 is results of a second test that tested the prediction accuracy of the trained model from which selected two nodes had been dropped out.

Next, the following describes results of testing the drowsiness prediction accuracy of the trained model 50 from which one or more selected nodes (filters) 54 have been dropped out with reference to FIGS. 3 and 4.

Let us assume that, in this example, a prepared number of image data frames, each of which shows a predetermined character, are used as input information to be inputted to the trained model 50. In addition, let us assume that the trained model 50 outputs, in response to an image data frame being input thereto, output information indicative of whether the predetermined character in the image data frame is accurately recognized. For each of the prepared image data frames, the predetermined character, which is a truth data item for the corresponding one of the prepared image data frames, has been paired to the corresponding one of the prepared image data frames.

Each node 54 in the trained model 54 works as a filter with a predetermined corresponding filtering function of the inputted image data frames.

Additionally, let us assume that the drowsiness prediction accuracy of the original model 50 when the prepared image data frames are input thereto is represented as a percentage value. That is, the drowsiness prediction accuracy of the original model 50 represents the percentage of the number of image data frames, which are accurately recognized as the predetermined character, to the total number of image data frames.

In particular, FIG. 3 shows results of a first test that tested the drowsiness prediction accuracy of the trained model 50 from which a selected one node (filter) 54 had been dropped out when the prepared image data frames are input thereto. FIG. 4 also shows that results of a second test that tested the drowsiness prediction accuracy of the trained model 50 from which selected two nodes (filters) 54 had been dropped out when the prepared image data frames are input thereto.

Note that the number of nodes (filters) 54 in the intermediate layers 56 is set to 30 for each of the results illustrated in FIG. 3 and the results illustrated in FIG. 4.

Because the number of one or more nodes 54 to be dropped out from the trained model 50 is set to 1 in the first test, there are 30 possible combinations upon any one of the nodes 54 being selected to be dropped out from the trained model 50. For this reason, a drowsiness prediction accuracy of the trained model 50 from which a selected one node (filter) 54 had been dropped out was calculated for each of the 30 possible combinations. In FIG. 3, the horizontal axis represents that the 30 possible combinations to which filter candidate indexes 1 to 30 have been respectively assigned are aligned while filter candidate index 0 represents a case where no nodes 54 have been dropped out from the trained model 50. In FIG. 3, the vertical axis represents the drowsiness prediction accuracy of the trained model 50 for the respective filter candidate indexes 0 to 30.

FIG. 3 clearly shows that the drowsiness prediction accuracy of the trained model 50 from which the node 54 with the filter index 28 has been dropped out has a significant drop of, for example, approximately 2% as compared with the drowsiness prediction accuracy of the original model 50. In FIG. 3, some dropped-out filters 54, each of which resulted in the corresponding drowsiness prediction accuracy of the trained model 50 relatively significantly being fallen, are edge filters for detecting vertical or horizontal edges of the outline of the predetermined character.

Additionally, because the number of one or more nodes 54 to be dropped out from the trained model 50 is set to 2 in the second test, there are 435 possible combinations upon any two of the nodes 54 being selected to be dropped out from the trained model 50. For this reason, the drowsiness prediction accuracy of the trained model 50 from which selected two nodes (filters) 54 had been dropped out was calculated for each of the 435 possible combinations. In FIG. 4, the horizontal axis represents that the 435 possible combinations to which filter candidate indexes 1 to 435 have been respectively assigned are aligned while filter candidate index 0 represents a case where no nodes 54 have been dropped out from the trained model 50. In FIG. 4, the vertical axis represents the drowsiness prediction accuracy of the trained model 50 for the respective filter candidate indexes 0 to 435.

FIG. 4 clearly shows that the drowsiness prediction accuracy of the trained model 50 from which selected two nodes 54 have been dropped out has a largest drop of, for example, approximately 15% as compared with the drowsiness prediction accuracy of the original model 50. This largest drop in the drowsiness prediction accuracy of the trained model 50 from which selected two nodes 54 have been dropped out is more than twice, in particular, to seven times, the largest drop in the drowsiness prediction accuracy of the trained model 50 from which a selected node 54 has been dropped out. This shows that, rather than each node 54 in the trained model 50 having a great impact on the accuracy of the trained model 50, the combination of some nodes 54 has a greater impact on the accuracy of the trained model 50.

In FIG. 4, some dropout filters 54, each of which resulted in the corresponding drowsiness prediction accuracy of the trained model 50 relatively significantly being fallen, are edge filters for detecting vertical or horizontal edges.

The information processing apparatus 10 configured based on the features set forth above therefore makes it possible to identify one or more nodes 54 in the trained model 50 as one or more relatively coadapted nodes 54 as long as the accuracy of the trained model 50 from which the one or more nodes 54 have been dropped out decreases relatively large.

The information processing apparatus 10 of the exemplary embodiment, which is capable of identifying, in all the nodes 54 of the trained model 50, one or more coadapted nodes important to the accuracy of the trained model 50, makes it possible to elucidate black-box models 50 as white-box models 50, thus enabling users to understand the reason why input information inputted to such a white-box model 50 leads to output information outputted from the white-box model 50.

Additionally, the information processing apparatus 10 of the exemplary embodiment is configured to 1. Select, from the nodes 54 of the trained model 50, plural nodes 54 to be dropped out from the trained model 50

2. Calculate the accuracy of the trained model 50 from which the selected nodes 54 have been dropped out This configuration enables users to easily understand an impact of the combination of the selected dropout nodes 54 on the accuracy of the trained model 50.

Hereinafter, the above task of the information processing apparatus 10, which identifies one or more coadapted nodes in the trained model 50, will be referred to as a coadapted node identification routine.

Next, the following describes how the processing unit 12 included in the information processing apparatus 10 of the exemplary embodiment carries out the coadapted node identification routine.

The processing unit 12 functionally includes a node selector 20, a model accuracy calculator 24, a regression expression generator 26, a repeat controller 28, and a coadapted node identifier 30; these functional components 20, 24, 26, 28, and 30 cooperatively perform the coadapted node identification routine.

First, the following describes a brief summary of the coadapted node identification routine according to the exemplary embodiment.

The coadapted node identification routine performs a node search task described in detail later to thereby identify, based on the result of the node search task, one or more relatively coadapted nodes 54.

Specifically, the node search task performs selection of one or more dropout nodes 54X from the nodes 54 in the trained model 50, and performs calculation of an accuracy of the trained model 50 from which the selected one or more dropout nodes 54X have been dropped out; the trained model 50 from which the selected one or more dropout nodes 54X have been dropped out will also be referred to as a dropout model.

Next, the node search task repeats selection of one or more new dropout nodes 54X and calculation of the accuracy of the trained model 50 from which the selected one or more dropout nodes 54X have been dropped out to thereby identify one or more relatively coadapted nodes in the trained model 50.

The node search task can perform selection of one or more dropout nodes 54X from all the nodes 54 constituting the trained model 50, or can perform selection of one or more dropout nodes 54X from a limited range of the nodes 54 constituting the trained model 50 if at least one not-coadapted node 54 is clearly determined; the limited range of the nodes 54 does not include the at least one not-coadapted node 54.

In particular, the information processing apparatus 10 performs, as an example of the node search task, a black-box optimization task. The black-box optimization task is not associate with the black-box model but used to optimize an objective function with an unknown input-output relationship based on observable outputs from the objective function in response to variable inputs given to the objective function. Optimizing the objective function means to maximize or minimize the outputs from the objective function and the corresponding inputs given to the objective function.

Next, the following describes a brief summary of how the information processing apparatus 10 performs the black-box optimization task.

Specifically, the information processing apparatus 10 performs a first step of selecting one or more dropout nodes 54X from the nodes 54 in the original model 50 to generate a dropout model, and a second step of applying a test dataset to the dropout model to thereby calculate an accuracy of the dropout model.

Thereafter, the information processing apparatus 10 performs a third step of generating a regression expression based on the relationship between the accuracy of the dropout model and the combination of the nodes 54 constituting the dropout model; this regression expression is a prediction expression for predicting the accuracy of the dropout model.

Next, the information processing apparatus 10 performs a fourth step of repeating a sequence of the first to third steps while the first step selects new dropout nodes 54X from the original model 50 for each sequence until a predetermined termination condition of the repeating of the sequence is satisfied. The prediction accuracy of the regression expression generated for the respective sequences becomes higher on average as the number of the repeated sequences increases.

The information processing apparatus 10 performs a fifth step of determining the combination of nodes 54 that constitutes the dropout model with a lower accuracy in response to determination that the predetermined termination condition of the repeating of the sequence is satisfied.

That is, the sufficiently higher prediction accuracy of the regression expression enables the combination of nodes 54 constituting a dropout model with a sufficiently lower accuracy thereof to be determined.

Next, the following describes each component included in the processing unit 12.

The node selector 20 is configured to select, from the nodes 54 constituting the original model 50, one or more dropout nodes 54X. Note that the number of dropout nodes 54X to be dropped out from the original model 50 can be freely set unless it does not exceed a predetermined upper limit. The upper limit can be freely set.

The node selector 20 can be configured to randomly select, from the original model 50 for the first sequence, and to select, from the original model 50, dropout nodes 54X in accordance with a minimization function for each of the second sequence and subsequent sequences. How the node selector 20 selects, from the original model 50, dropout nodes 54X in accordance with the minimization function for each of the second sequence and subsequent sequences will be described later.

The exemplary embodiment defines selection indicators $s_{ij}$, each of which represents which of the nodes 54 constitutes the dropout model. That is, setting the selection indicator $s_{ij}$ for a node 54 to 1 represents that the node 54 is selected as a dropout node 54X, and setting the selection indicator $s_{ij}$ for a node 54 to 0 represents that the node 54 constitutes the dropout model. Another method of selecting one or more dropout nodes 54X, such as a method of inversion of one or more dropout nodes 54X, can be used.

The model accuracy calculator 24 is configured to calculate an accuracy of the original model 50 without node-dropout using a test dataset (V, W) that is comprised of input data items V and ground-truth data items W that are respectively paired to each other.

That is, the model accuracy calculator 24 is configured to input the input data items V to the original model 50, obtain output data items from the original model 50, and calculate a percentage of agreement between the obtained output data items and the respective ground-truth data items as an accuracy of the original model 50.

Similarly, the model accuracy calculator 24 is configured to calculate an accuracy of the dropout model for each sequence using the same test dataset (V, W).

Calculation of both an accuracy of the original model 50 and an accuracy of the dropout model using the same test dataset (V, W) enables the accuracy of the dropout model to be compared to the accuracy of the original model 50.

The regression expression generator 26 is configured to perform a regression-expression generation task of generating a regression expression based on the combination, which will be referred to as the combination Sc, of nodes 54 constituting the dropout model and the accuracy of the dropout model; the regression expression represents the relationship between the combination Sc of nodes 54 constituting the dropout model and the accuracy of the dropout model.

In other words, the relationship between the combination Sc of nodes 54 constituting the dropout model and the accuracy of the dropout model 50 represents the relationship between the selected one or more dropout nodes 54X and the accuracy of the dropout model.

Specifically, the regression expression generator 26 uses the individual selection indicators $s_i$ and $s_j$ for the nodes 54 to generate the regression expression in accordance with the following expression (1):

$$Z = \Sigma_{i,j} a_{ij} s_i s_j + \Sigma_i b_i s_i \qquad (1)$$

where Z represents the accuracy of the dropout model, $a_{ij}$ represents weight parameter for the product of the selection indicators $s_i$ and $s_j$, and bi represents the weight parameter for the selection indicator $s_i$.

That is, the above regression expression (1) predicts an accuracy Z of the dropout model as a function of the selection indicators, so that an accuracy Z of the dropout model obtained based on the regression expression (1) is also be referred to as a predicted accuracy of the dropout model.

As described above, setting the selection indicator $s_i$ (or $s_j$) for a node 54 to 1 represents that the node 54 is selected as a dropout node 54X, and setting the selection indicator $s_i$ (or s) for a node 54 to 0 represents that the node 54 constitutes the dropout model.

That is, the regression expression (1), which predicts the accuracy Z of the dropout model, represents the sum of (1) The total sum of the products of the weight parameters ij and the product of the selection indicators $s_i$ and $s_j$ (2) The total sum of the products of the weight parameters bi and the respective selection indicators $s_i$ As described later in detail, the regression expression generator 26 is for example configured to statistically determine each representative weight parameter $a_{ij}$ and each representative weight parameter bi in accordance with a probability distribution $P(a_{ij})$ of the corresponding weight parameter $a_{ij}$ and a probability distribution $P(b_i)$ of the corresponding weight parameter $b_i$.

The exemplary embodiment uses the regression expression (1) as a model expression to predict the accuracy Z of the dropout model, so that the accuracy Z of the dropout model, which is a function of the regression expression (1), can be referred to as a minimization function.

The regression expression has quadratic terms, but can have the third-order or higher-order terms. The regression expression having the third-order or higher-order terms enables more suitable coadapted nodes to be identified than the regression expression having quadratic terms. Using auxiliary variables used to express the third-order or higher-order terms enables the regression expression to be expressed by quadratic terms.

When a sequence of the selection task of the node selector 20, the model accuracy calculation task of the model accuracy calculator 24, and the regression expression generation task of the regression expression generator 26 is carried out first time, data indicative of the relationship between the combination Sc of nodes 54 constituting the dropout model and the accuracy of the dropout model is at least one data item.

An increase in execution of the number of the sequences while at least partly changes selection of dropout nodes 54X enables the number of data items stored in, for example, the large-capacity storage device 18, each of which represents the relationship between the combination Sc of nodes 54 constituting the dropout model and the corresponding accuracy Z, to increase.

In other words, repeating of the sequence while at least partly changing selection of dropout nodes 54X enables the latest regression expression generated by the regression expression generation task of the latest sequence to have, on average, higher accuracy of predicting the accuracy Z of the of the dropout model.

Specifically, the repeat controller 28 causes the node selector 20, model accuracy calculator 24, and regression expression generator 26 to repeat the sequence of the respective selection task, accuracy calculation task, and regression expression generation task while causing the node selector 20 to at least partly change selection of dropout nodes 54X, which defines the combination Sc of nodes 54 constituting the dropout model, in order to increase the prediction accuracy of the latest regression expression.

The repeat controller 28 causes the node selector 20, model accuracy calculator 24, and regression expression generator 26 to repeat the sequence of the respective selection task, accuracy calculation task, and regression expression generation task until a predetermined termination condition of the repeating of the sequence is satisfied.

The coadapted node identifier 30 identifies, based on the accuracy of each dropout model 50, one or more relatively coadapted nodes 54.

In particular, the coadapted node identifier 30 selects at least one dropout model after the predetermined termination condition is satisfied; the accuracy of the selected at least one dropout model is relatively lower than the accuracies of the respective other dropout models 50. Then, the coadapted node identifier 30 identifies, based on the nodes 54 constituting the selected at least one dropout model, one or more nodes 54 that are not included in the selected at least one dropout model as one or more relatively coadapted nodes 54.

More specifically, the coadapted node identifier 30 selects at least one dropout model after the predetermined termination condition is satisfied; the accuracy of the selected at least one dropout model is lower than a predetermined threshold value. Then, the coadapted node identifier 30 identifies, based on the nodes 54 constituting the selected at least one dropout model, one or more nodes 54 that are not included in the selected at least one dropout model as one or more relatively coadapted nodes 54.

Let us assume that remaining nodes 54 are the nodes 54, included in the original model 50, set to 0 in the node combination Sc.

Figures 5, 6:
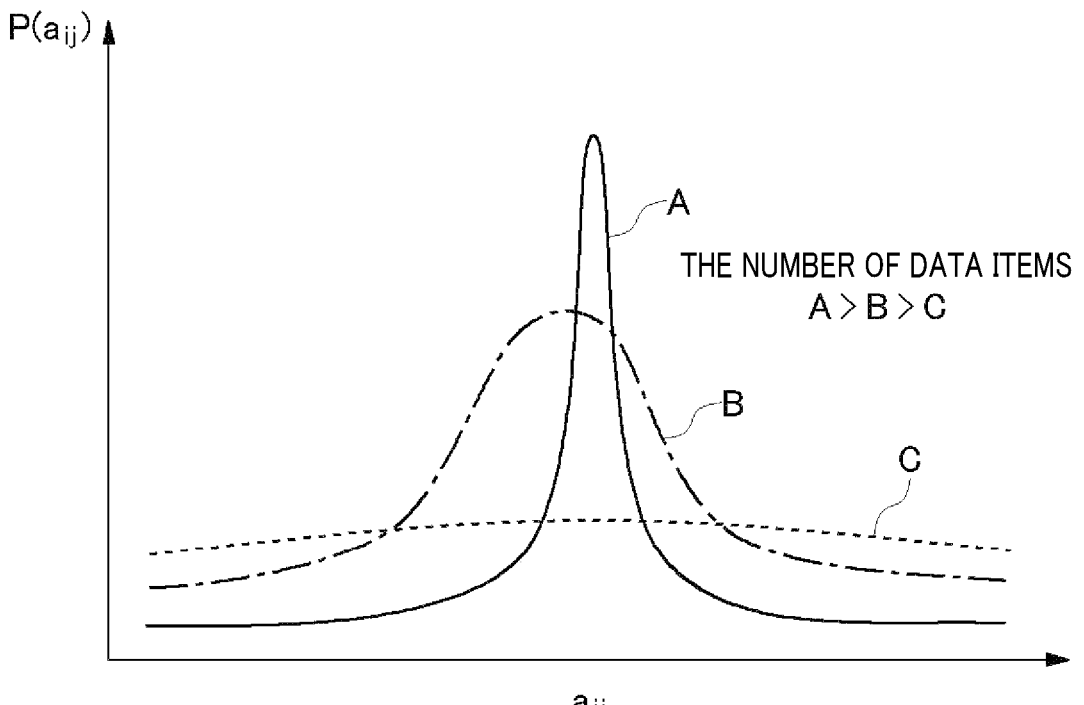
FIG. 5 is a table schematically illustrating (i) combinations each comprised of the dropout nodes and (ii) the accuracies of the respective dropout models.
FIG. 6 is a graph schematically illustrating an example of a probability distribution of a weight parameter according to the exemplary embodiment.

FIG. 5 schematically illustrates

1. A first combination $S_{c1}$ of the remaining nodes 54 constituting a first dropout model to an n-th combination Sen of the remaining nodes 54 constituting an n-th dropout model, which are respectively obtained by the n-th repeating of the sequence 2. A first accuracy $Z_1$ of the first dropout model to an n-th accuracy $Z_n$ of the n-th dropout model, which are respectively obtained by the n-th repeating of the sequence That is, the first combination $S_{c1}$ of the remaining nodes 54 constituting the first dropout model to the n-th combination Sen of the remaining nodes 54 constituting the n-th dropout model, which are respectively obtained by the n-th repeating of the sequence, are sequentially stored in the large-capacity storage device 18.

Similarly, the first accuracy $Z_1$ of the first dropout model to the n-th accuracy $Z_n$ of the n-th dropout model, which are respectively obtained by the n-th repeating of the sequence, are sequentially stored in the large-capacity storage device 18 such that they are correlated with the respective first to n-th combinations $S_{c1}$ to $S_{cn}$ of the remaining nodes 54 of the first to n-th dropout models.

For example, as described above, inputting the input data items V of the test dataset (V, W) to the first dropout model constituting the first combination $S_{c1}$ in the first sequence results in the first value $Z_1$ of the accuracy of the first dropout model being obtained.

The regression expression generator 26 generates the regression expression in accordance with the first combination Sal of the first dropout model and the first value $Z_1$ of the accuracy of the first dropout model.

Then, the node selector 20 selects, based on the regression expression, one or more dropout nodes 54X to thereby generate the second dropout model constituting the second combination $S_{c2}$.

Inputting the input data items V of the test dataset (V, W) to the second dropout model constituting the second combination Se in the second sequence results in the second value $Z_2$ of the accuracy of the second dropout model being obtained.

The regression expression generator 26 generates the regression expression in accordance with 1. The first combination $S_{c1}$ of the first dropout model and the first value $Z_1$ of the accuracy of the first dropout model
2. The second combination Se of the second dropout model and the second value $Z_2$ of the accuracy of the second dropout model This enables the prediction accuracy of the regression expression in the second sequence to be higher than the prediction accuracy of the regression expression calculated in the first sequence.

Thereafter, the node selector 20 selects, based on the regression expression, one or more dropout nodes 54X to thereby generate the third dropout model constituting the third combination $S_{c3}$.

Inputting the input data items V of the test dataset (V, W) to the third dropout model constituting the third combination $S_{c3}$ in the third sequence results in the third value Zs of the accuracy of the third dropout model being obtained.

The regression expression generator 26 generates the regression expression in accordance with 1. The first combination $S_{c1}$ of the first dropout model and the first value $Z_1$ of the accuracy of the first dropout model
2. The second combination $S_{c2}$ of the second dropout model and the second value $Z_2$ of the accuracy of the second dropout model
3. The third combination $S_{c3}$ of the third dropout model and the third value $Z_3$ of the accuracy of the third dropout model This enables the prediction accuracy of the regression expression in the third sequence to be higher than the prediction accuracy of the regression expression calculated in each of the first and second sequences.

In particular, the node selector 20 is configured to select, for each sequence, one or more dropout nodes 54X from each layer of the intermediate layers 56. This configuration enables at least one coadapted node 54 to be extracted from each layer of the intermediate layers 56. The node selector 20 can be configured to select, from each layer of the intermediate layers 56, plural dropout nodes 54X.

That is, (i) selection of one or more dropout nodes 54X to generate the node combination $S_{ct}$ (t=1, 2, . . . , n) of the t-th dropout model, (ii) input of the input data items V of the test dataset (V, W) to the t-th dropout model to thereby obtain the t-th value $Z_t$ of the accuracy of the t-th dropout model, and (ii) generation of the regression expression are repeated. This results in an increase of the data items required to generate the regression expression, making it possible to finally generate the regression expression with the higher prediction accuracy.

Next, the following describes why the prediction accuracy of the regression expression becomes higher as the number of data items of the node combinations $S_{ct}$ and the values $Z_t$ of the accuracy of the dropout model increases.

As described above, the regression expression generator 26 of the exemplary embodiment statistically determines each weight parameter aij and each weight parameter bi in accordance with a probability distribution P(aij) of the corresponding weight parameter aij and a probability distribution P(bi) of the corresponding weight parameter bi (see FIG. 6). In other words, this process is the Bayesian regression, which determines the distributions, followed by determination of the weight parameters aij and bi by sampling from the distributions. Note that FIG. 6 illustrates only an example of the probability distribution P(aij) of any weight parameter aij. The probability distribution P(bi) of any weight parameter bi has a similar distribution form of that of the probability distribution P(aij). The formulation of the Bayesian regression for combinatorial optimization problems was originally introduced in "Bayesian optimization combinatorial Structures" by Baptista and Poloczek. This document is incorporated in its entirely herein by reference.

If the number of data items, each of which is the corresponding node combination $S_{ct}$ and corresponding error $Z_t$, stored in the large-capacity storage device 18 is small, the probability distribution $P(a_{ij})$ of any weight parameter $a_{ij}$ has a broader distribution form (see the distribution form C illustrated in FIG. 6). An increase in the number of data items (see FIG. 5), each of which is the corresponding node combination $S_{ct}$ and corresponding value Z of the accuracy of the dropout model, enables the probability distribution $P(a_{ij})$ of any weight parameter $a_{ij}$ to have a narrower, i.e. sharper, distribution form (see the distribution forms B and A illustrated in FIG. 6). This therefore enables the prediction accuracy of the regression expression to become higher as the number of data items of the node combinations $S_{ct}$ and the values $Z_t$ of the accuracy of the dropout model increases.

In particular, the node selector 20 is configured to obtain next one or more dropout nodes 54X from the nodes 54 of the original model 50 using a representative value of each weight parameter $a_{ij}$ and a representative value of each weight parameter $b_i$ such that the corresponding node combination $S_{ct}$ of the dropout model enables the minimization function to be minimized.

For example, the node selector 20 obtains, as the representative value of each weight parameter $a_{ij}$, a sampled value from the probability distribution $P(a_{ij})$ of the corresponding weight parameter $a_{ij}$, and obtains, as the representative value of each weight parameter $b_i$, a sampled value from the probability distribution $P(b_i)$ of the corresponding weight parameter $b_i$.

Note that the node selector 20 of the exemplary embodiment is configured to select a next combination $S_{ct}$ of nodes 54 such that the selected next combination $S_{ct}$ of nodes 54 minimizes the minimization function, which aims to improve the prediction accuracy of the corresponding regression expression. The node selector 20 can be configured to select a next combination $S_{ct}$ of nodes 54 without minimizing the minimization function. For example, the node selector 20 can be configured to randomly select a next combination Set of nodes 54 from the original model 50.

Figure 7:
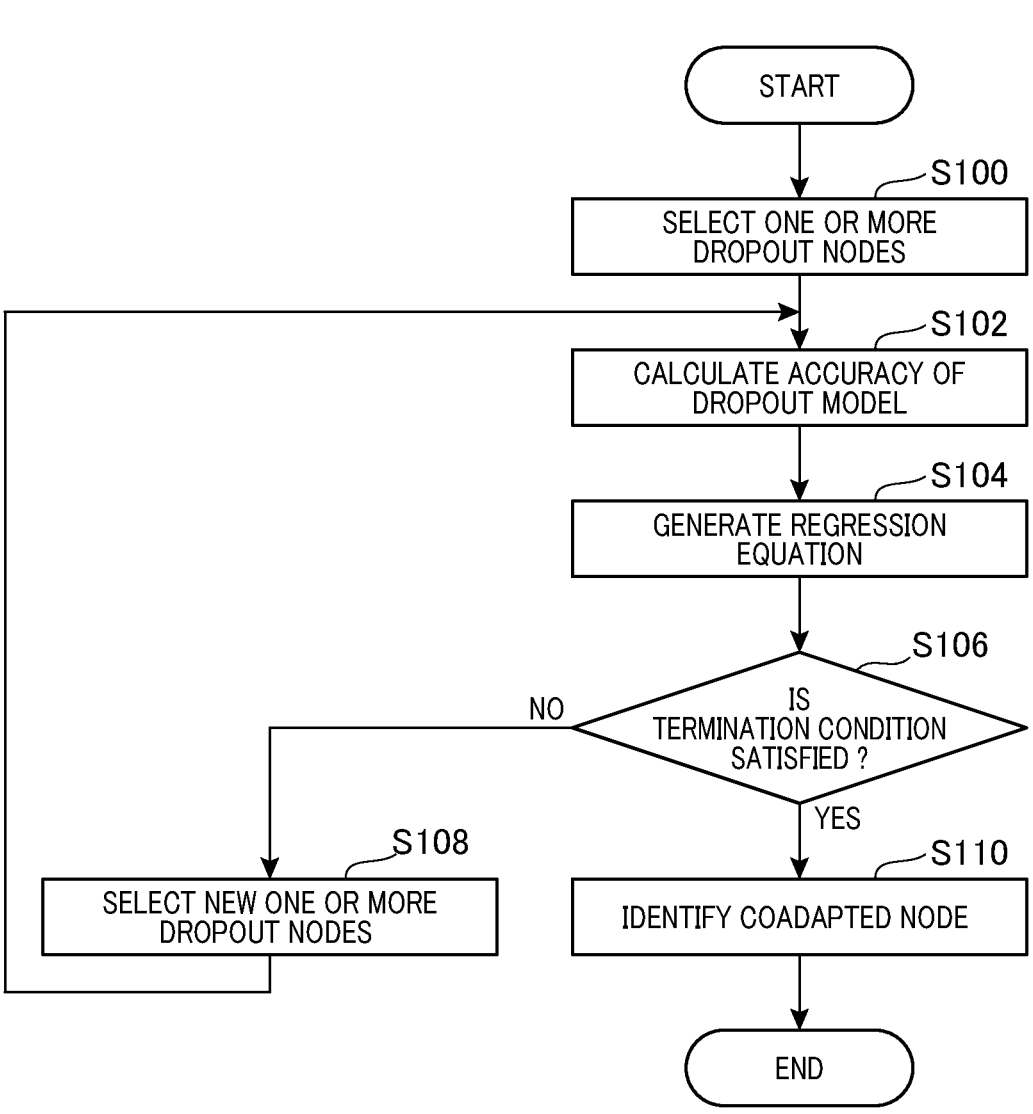
FIG. 7 is a flowchart schematically illustrating an example of a sequence of a coadapted node identification routine carried out by the processing unit illustrated in FIG. 1.

The following describes the coadapted node identification routine carried out by the processing unit 12 of the information processing apparatus 10 in accordance with the at least one program stored in, for example, the ROM 12. FIG. 7 is a flowchart schematically illustrating the sequence of the coadapted node identification routine carried out by the processing unit 12.

When starting the coadapted node identification routine, the processing unit 12 serves as the node selector 20 to select, from the original model 50, one or more dropout nodes 54X in step S100. For example, the node selector 20 randomly selects, from the original model 50, one or more dropout nodes 54X to thereby generate a dropout model in step S100.

Next, the processing unit 12 serves as the model accuracy calculator 24 to calculate a value $Z_t$ of the accuracy of the dropout model using the test dataset (V, W) in step S102. Note that the initial value of the repetition-number variable t is set to 1.

Subsequently, the processing unit 12 serves as the regression expression generator 26 to perform the regression-expression generation task of generating a regression expression indicative of the minimization function, which is represented by the above expression (1), in accordance with the combination $S_{ct}$ of nodes 54 constituting the dropout model and the value $Z_t$ of the accuracy of the dropout model in step S104.

Following the operation in step S104, the processing unit 12 serves as the repeat controller 28 to determine whether the predetermined termination condition is satisfied based on, for example, the repetition-number variable t of the combination $S_{ct}$ of nodes 54 constituting the dropout model and the value Z of the accuracy of the dropout model in step S106.

Specifically, the repeat controller 28 for example checks whether the repetition-number variable t has reached a predetermined threshold number, and determines that the predetermined termination condition is satisfied upon checking that the repetition-number variable t has reached the predetermined threshold number (YES in step S106).

In contrast, the repeat controller 28 determines that the predetermined termination condition is not satisfied upon determining that the repetition-number variable t has not reached the predetermined 15 threshold number (NO in step S106).

As another example, the repeat controller 28 checks whether the accuracy of the dropout model becomes lower than or equal to a predetermined threshold value, and determines that the predetermined termination condition is satisfied upon checking that the accuracy of the 20 dropout model becomes lower than or equal to the predetermined threshold value (YES in step S106). Otherwise, the repeat controller 28 determines that the predetermined termination condition is not satisfied upon checking that the accuracy of the dropout model is higher than the predetermined threshold value (NO in step S106).

Upon the predetermined termination condition being not satisfied (NO in step S106), the integrated-model generating routine proceeds to step S108. Otherwise, upon confirming that the predetermined termination condition is satisfied (YES in step S106), the integrated-model generating routine proceeds to step S110.

In step S108, the processing unit 12 serves as the node selector 20 to increment the repetition-number variable t by 1, i.e. t←t+1, and selects, from the original model 50, one or more new dropout nodes 54X to thereby generate a new dropout model; this selection of the one or more new dropout nodes 54X enables the prediction accuracy of the corresponding regression expression to become higher.

Preferably, the node selector 20 of the exemplary embodiment selects, from the original model 50, one or more new dropout nodes 54X to enable the deviation between a predicted accuracy of the dropout model and a corresponding actually calculated accuracy Z of the dropout model to be smaller than that in the previous sequence.

In particular, the node selector 20 of the exemplary embodiment more preferably selects, from the original model 50, one or more new dropout nodes 54X to enable the deviation between a predicted accuracy of the dropout model and a corresponding actually calculated accuracy $Z_t$ of the dropout model to be smaller than that in the previous sequence around the node combination $S_c$ which constitute the dropout model with the minimum 15 accuracy Z.

That is, the node selector 20 is configured to select, from the original model 50, one or more new dropout nodes 54X that generates the regression expression having a higher prediction accuracy on average as the number of the repeated sequences, i.e. data items, increases.

For example, the node selector 20 of the exemplary embodiment selects, from the original model 50, one or more dropout nodes 54X in accordance with the following argument of the minimum of the function $(\Sigma_{i,j}a_{ij}s_is_j+\Sigma_ib_is_j+\lambda\Sigma_i\|s_i\|_1)$ expressed by the following expression (2):

$$\mathrm{argmin}_{S_c\in\{0,1\}}{}^D(\Sigma_{i,j}a_{ij}s_is_j+\Sigma_ib_is_j+\lambda\Sigma_i\|s_i\|_1) \qquad (2)$$

where argmin $f(x)$ stands for argument of the minimum of the function $f(x)$, $\lambda\|s_i\|_1$ represents a normalization term with a hyper parameter $\lambda$, $\Sigma_i\|s_i\|_1$ represents a L1 norm, and D represents the number of nodes 54 in the trained model 50.

The expression (2) searches for node combination $S_{ct}$, from all the nodes 54 in the trained model 50, to select the dropout nodes 54X and the remaining nodes 54; the combination $S_{ct}$ minimizes the value Z of the accuracy of the dropout model.

As described above, the third term $\lambda\Sigma_i\|s_i\|_1$ in the expression (2) represents the normalization term with the hyper parameter $\lambda$, and the normalization term with the hyper parameter $\lambda$ enables the number of the dropout nodes 54X to be adjusted. Note that the number of dropout nodes 54X from the original model 50 cannot be necessarily defined based on the normalization term with the hyper parameter $\lambda$, and therefore can be previously determined.

As described above, the smaller the repetition number of the sequences from step S102 to S108, the lower the prediction accuracy of the regression expression, so that a node combination $S_{ct}$ selected in accordance with the expression (2) is substantially close to a node combination based on one or more randomly selected dropout nodes 54X.

In contrast, the larger the repetition number of the sequences from step S102 to S108, the higher the prediction accuracy of the regression expression, so that a node combination $S_{ct}$ selected in accordance with the expression (2) becomes closer to an optimum node combination that the information processing apparatus 10 finally wants to obtain.

That is, the processing unit 12 is capable of covering various allowable node combinations $S_{ct}$ selected from the original model 50 in the early stage and increasing the prediction accuracy of the regression expression around the node combination $S_c$ which constitute the dropout model with the minimum accuracy Z in the late stage. Note that the node selector 20 can use another measure or means to thereby select, from the trained model 50, one or more dropout nodes 54X.

Following selection of the one or more new dropout nodes 54X, the processing unit 12 repeats the sequence from step S102 to S108 based on a node combination $S_{cr}$ selected from the original model 50 until the determination in step S106 is affirmative (YES in step S106).

That is, upon confirming that the predetermined termination condition is satisfied (YES in step S106), the processing unit 12 serves as the coadapted node identifier 30 to select at least one of the dropout models whose prediction accuracies are lower than the predetermined threshold value. Then, the processing unit 12 serves as the coadapted node identifier to identify, based on the nodes 54 constituting the selected at least one of the dropout models, one or more nodes 54 that are not included in the selected at least one dropout model as one or more relatively coadapted nodes 54.

After completion of the operation in step S110, the processing unit 12 terminates the coadapted node identification routine.

As described above, the coadapted node identification routine of the exemplary embodiment performs selection of plural dropout nodes 54X from the original model 50. This makes it possible to identify the combination of coadapted nodes 54, which have an influence on the accuracy of the trained model 50, beyond identifying a single coadapted node 54, which has an influence on the accuracy of the trained model 50. This therefore efficiently contributes to elucidate the original model 50 as a white-box model 50, which enables users to understand the essential paths from input information to output information processed by the trained model 50.

Modifications

The exemplary embodiment of the present disclosure has been described, but the present disclosure is not limited to the above exemplary embodiment, and can be variably changed and/or modified within the scope of the present disclosure.

The exemplary embodiment is configured to use, as the search condition, the argument of the minimum of the function $(\Sigma_{i,j}a_{ij}s_{i}s_{j}+\Sigma_{i}b_{i}s_{i}+\lambda\Sigma_{i}\|s_{i}\|_{1})$ expressed by the expression (2). The present disclosure is however not limited to this configuration. Specifically, the present disclosure can be configured to use, as the search condition, the argument of the maximum of another function to select one or more dropout nodes from the original model 50, so that the deviation between an accuracy of the original model 50 and an accuracy of the dropout model becomes greater.

The exemplary embodiment identifies one or more coadapted nodes in the intermediate layers 56 of the neural network, but the present disclosure is not limited thereto. Specifically, if the input layer 52 is comprised of a plurality of nodes 54, the present disclosure can identify one or more coadapted nodes 54 in the input layer 52.

The exemplary embodiment uses a prepared number of image data frames, each of which shows the face of a corresponding driver who is driving a vehicle, as input information to the trained model 50, and uses, as output information from the trained model 50, information indicative of the corresponding driver's drowsiness. The present disclosure is however not limited thereto, and can use another information as input information to the trained model 50 and another information as output information from the trained model 50.

The exemplary embodiment applies, as a regression model, the regression expression using a probability distribution, which is represented by the above expression (1), but the present disclosure is not limited thereto. Specifically, the present disclosure can apply, as a regression model, another approach or another algorithm, such as a Factorization Machine algorithm as described in "Designing metamaterials with quantum annealing and factorization machines" by Kitai et al.

The exemplary embodiment uses the black-box optimization task for identifying one or more coadapted nodes 54 in the trained model 50, but the present disclosure is not limited thereto. Specifically, the present disclosure can use another task, which can identify one or more coadapted nodes 54 in the trained model 50.

The exemplary embodiment uses, as the appropriateness of the trained model 50, the accuracy of the trained model 50, but the present disclosure is not limited thereto. The present disclosure can use another metric that represents the appropriateness of the trained model 50 as a numerical value. For example, in addition to the accuracy of the trained model 50 the present disclosure can use a selected one of 1. The precision of the trained model 50
2. The recall of the trained model 50
3. The F-measure of the trained model 50
4. The Confusion matrix of the trained model 50
5. The micro-average of the trained model 50
6. The macro-average of the trained model 50
7. The receiver operating characteristic (ROC) curve of the trained model 50
8. The area under the curve (AUC) of the trained model 50

The loss function can be applied as a metric of training of the trained model 50. The mean IoU (mIoU) or the result of image comparison can be applied as a metric for applications.

Additionally, the above exemplary embodiment is configured to identify one or more relatively coadapted nodes 54 in the trained model 50 in accordance with how the accuracy of the dropout model 50 decreases, but the present disclosure is not limited to this configuration. Specifically, the present disclosure can be configured to identify one or more relatively coadapted nodes 54 in the trained model 50 in accordance with how the accuracy of the dropout model 50 changes, such as increases.

The present disclosure can be preferably applied to trained models, each of which is comprised of plural nodes, such as a neural network.

The present disclosure can be implemented by various embodiments in addition to the above image processing apparatus; the various embodiments include systems each including the image processing apparatus, programs for serving a computer as the image processing apparatus, storage media, such as non-transitory storage media storing the programs, and image processing methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An information processing apparatus for elucidating a black-box model to a white-box model, the information processing apparatus comprising:

a memory storing a set of computer program instructions; and at least one computer configured to:

perform, in accordance with the set of computer program instructions, a node search task that includes:

a selection task of selecting, from a plurality of nodes that constitute a trained model, plural nodes that are to be dropped out from the trained model as dropout nodes, the trained model, from which one or more identified coadapted nodes have been dropped out, is configured to have a lower accuracy than the trained model including the one or more identified coadapted nodes, the trained model being configured as an image recognition model and configured to output, in response to input of image information that includes images being input thereto, output information as a recognition result of the input image information, and dropping out the dropout nodes from the trained model to accordingly generate a dropout model, the trained model comprising the black-box model in which an input-output relationship between the image information and the outputted information as the recognition result is not identifiable;

a calculation task of calculating an appropriateness of the dropout model;

a generation task of generating a regression expression that represents a relationship between (i) a combination of nodes constituting the dropout model and (ii) the appropriateness of the dropout model;

a control task of repeatedly performing a sequence of the selection task, the calculation task, and the generation task, the selection task selecting, for each sequence, new dropout nodes that are to be dropped out from the trained model as the dropout nodes until a predetermined termination condition is satisfied, the regression expressions generated for the respective repeated sequences having a higher prediction accuracy on average as the number of the repeated sequences increases; and perform, based on a result of the node search task, an identification task of:

selecting at least one of the dropout models generated during the repeated sequences, an appropriateness of the selected at least one of the dropout models being lower than a predetermined threshold; and identifying one or more nodes that are not included in the selected at least one of the dropout models as one or more coadapted nodes, wherein:

the at least one computer is configured to perform the generation task of generating the regression expression in accordance with the following expression (1):

$$Z = \Sigma_{i,j} a_{ij} s_i s_j + \Sigma_i b_i s_i \qquad (1)$$

where:

$Z$ represents the appropriateness of the dropout model;

each of $s_i$ and $s_j$ is a selection indicator representing which of the nodes is included in the dropout model;

$a_{ij}$ represents weight parameters for the respective selection indicators $s_i$ and $s_j$; and $b_i$ represents the weight parameter for the selection indicator $s_i$.

2. The information processing apparatus according to claim 1, wherein:

the at least one computer is configured to obtain each of the weight parameters of the regression expression as a corresponding probability distribution.

3. The information processing apparatus according to claim 1, wherein the regression expression includes at least one 3rd-order or higher-order term.

4. The information processing apparatus according to claim 1, wherein the at least one computer comprises at least one quantum computer.

5. The information processing apparatus according to claim 1, wherein:

the input information being input to the trained model includes, as the images, a plurality of images each showing a part of a driver of a vehicle; and the trained model is configured as a driver's state recognition model and configured to output, in response to input of the image information, a state of the driver as the recognition result of the input image information.

6. The information processing apparatus according to claim 5, wherein:

each of the images shows, as the part of the driver, a face of the driver; and the trained model is configured to output, in response to input of the image information, a drowsiness of the driver as the state of the driver.

7. The information processing apparatus according to claim 1, wherein:

the calculation task calculates the appropriateness of the dropout model using a test dataset that is comprised of input data items and ground-truth data items that are respectively paired to each other, by inputting, as the image information, image input data items to the dropout model and obtaining, as the output information, output data items indicative of a recognition result of the image input data items from the dropout model, and by calculating a percentage of agreement between the output data items and the respective ground-truth data items as the appropriateness of the dropout model.

8. The information processing apparatus according to claim 1, wherein:

the trained model is a neural network model that includes an input layer comprised of a first set of nodes included in the plurality of nodes, an intermediate layer comprised of a second set of nodes included in the plurality of nodes, and an output layer;

the selection task selects, from the nodes of the second set of the intermediate layer, plural nodes that are to be dropped out from the intermediate layer as the dropout nodes, and drops out the dropout nodes from the intermediate layer to accordingly generate the combination of nodes constituting the dropout model;

the calculation task calculates, as the appropriateness of the combination as the dropout model, an accuracy of the combination as the dropout model; and the at least one computer is configured to perform selecting at least one of the combinations generated as the dropout models during the repeated sequences, the accuracy of the selected at least of the combinations being lower than the predetermined threshold.

9. The information processing apparatus according to claim 8, wherein:

the selection task determines the dropout nodes to be dropped out from the intermediate layer in accordance with the following expression (2):

$$\mathrm{argmin}_{Sc \in \{0,1\}} D(\Sigma_{i,j} a_{ij} s_i s_j + \Sigma_i b_i s_i + \lambda \Sigma_i \|s_i\|_1) \qquad (2)$$

where:

argmin(x) stands for argument of a minimum of a function x, the function x is $(\Sigma_{i,j} a_{ij} s_i s_j + \Sigma_i b_i s_i + \lambda \Sigma_i \|s_i\|_1)$;

$\lambda$ represents a hyper parameter, $\Sigma_i \|s_i\|_1$ represents a L1 norm of $s_i$, Sc represents the combinations; and D represents the number of the plurality of individual prediction models.

10. The information processing apparatus according to claim 1, wherein: the at least one computer is further configured to:

reconstruct the trained model into a modified model by linking the identified one or more relatively coadapted nodes to corresponding input-output features of the image information; and store, in the memory, node-dependency data representing inter-node relationships of the modified model.

11. The information processing apparatus according to claim 10, wherein:

the modified model is configured to:

output, via an interface unit, link information indicating input-output relationships of the identified one or more coadapted nodes; and display, on a user interface, visualization of the recognition result indicative of how the coadapted nodes contributes.

12. The information processing apparatus according to claim 1, wherein:

the trained model, which has been changed as a white-box model including the one or more identified coadapted nodes, is configured to provide, to a user, link information indicating of how the trained model works with the one or more identified coadapted nodes through an informing unit.

13. The information processing apparatus according to claim 1, wherein:

the trained model, which has been changed as a white-box learning model, is configured to provide, to a user, information indicative of link input-output relationships of the trained model with the one or more identified coadapted nodes through an informing unit.

14. The information processing apparatus according to claim 1, wherein:

the input information being input to the trained model includes, as the images, a plurality of images each showing a part of a driver of a vehicle; and the trained model, which has been changed as a white-box driver's state recognition model including the one or more identified coadapted nodes, is configured to obtain a higher recognition accuracy of the white-box driver's state recognition model as compared with the trained model that does not include the one or more identified coadapted nodes.

15. The information processing apparatus according to claim 1, wherein:

the input information being input to the trained model includes, as the images, a plurality of images each showing a part of a driver of a vehicle; and the trained model, after execution of the node search task that includes the selection task, calculation task, generation task, and identification task, has been changed to a white-box driver's state recognition model including the one or more identified coadapted nodes, and is configured to obtain a higher recognition accuracy for drowsiness determination compared to the trained model that does not include the one or more identified coadapted nodes.

16. A computer-implemented coadapted-node identification method for elucidating a black-box model to a white-box model, the method comprising:

performing a node search task that includes:

a selection task of selecting, from a plurality of nodes that constitute a trained model, plural nodes that are to be dropped out from the trained model as dropout nodes, the trained model, from which one or more identified coadapted nodes have been dropped out, is configured to have a lower accuracy than the trained model including the one or more identified coadapted nodes, the trained model being configured as an image recognition model and configured to output, in response to input of image information that includes images being input thereto, output information as a recognition result of the input image information, and dropping out the dropout nodes from the trained model to accordingly generate a dropout model, the trained model comprising the black-box model in which an input-output relationship between the image information and the outputted information as the recognition result is not identifiable;

a calculation task of calculating an appropriateness of the dropout model;

a generation task of generating a regression expression that represents a relationship between (i) a combination of nodes constituting the dropout model and (ii) the appropriateness of the dropout model;

a control task of repeatedly performing a sequence of the selection task, the calculation task, and the generation task, the selection task selecting, for each sequence, new dropout nodes that are to be dropped out from the trained model as the dropout nodes until a predetermined termination condition is satisfied, the regression expressions generated for the respective repeated sequences having a higher prediction accuracy on average as the number of the repeated sequences increases; and perform, based on a result of the node search task, an identification task of:

selecting at least one of the dropout models generated during the repeated sequences, an appropriateness of the selected at least one of the dropout models being lower than a predetermined threshold; and identifying one or more nodes that are not included in the selected at least one of the dropout models as one or more coadapted nodes, wherein:

the generation task of generating the regression expression is performed in accordance with the following expression (1):

$$Z = \Sigma_{i,j} a_{ij} s_i s_j + \Sigma_i b_i s_i \qquad (1)$$

where:

Z represents the appropriateness of the dropout model;

each of si and sj is a selection indicator representing which of the nodes is included in the dropout model;

aij represents weight parameters for the respective selection indicators si and sj; and bi represents the weight parameter for the selection indicator si.

17. A computer-readable program product for elucidating a black-box model to a white-box model, the computer-readable program product comprising:

a non-transitory computer-readable storage medium; and a set of computer program instructions stored in the computer-readable storage medium, the instructions causing a computer to:

perform a node search task that includes:

a selection task of selecting, from a plurality of nodes that constitute a trained model, plural nodes that are to be dropped out from the trained model as dropout nodes, the trained model, from which one or more identified coadapted nodes have been dropped out, is configured to have a lower accuracy than the trained model including the one or more identified coadapted nodes, the trained model being configured as an image recognition model and configured to output, in response to input of image information that includes images being input thereto, output information as a recognition result of the input image information, and dropping out the dropout nodes from the trained model to accordingly generate a dropout model, the trained model comprising the black-box model in which an input-output relationship between the image information and the outputted information as the recognition result is not identifiable;

a calculation task of calculating an appropriateness of the dropout model;

a generation task of generating a regression expression that represents a relationship between (i) a combination of nodes constituting the dropout model and (ii) the appropriateness of the dropout model;

a control task of repeatedly performing a sequence of the selection task, the calculation task, and the generation task, the selection task selecting, for each sequence, new dropout nodes that are to be dropped out from the trained model as the dropout nodes until a predetermined termination condition is satisfied, the regression expressions generated for the respective repeated sequences having a higher prediction accuracy on average as the number of the repeated sequences increases; and perform, based on a result of the node search task, an identification task of:

selecting at least one of the dropout models generated during the repeated sequences, an appropriateness of the selected at least one of the dropout models being lower than a predetermined threshold; and identifying one or more nodes that are not included in the selected at least one of the dropout models as one or more coadapted nodes wherein:

the generation task of generating the regression expression is performed in accordance with the following expression (1):

$$Z = \Sigma_{i,j} a_{ij} s_i s_j + \Sigma_i b_i s_i \qquad (1)$$

where:

Z represents the appropriateness of the dropout model;

each of si and sj is a selection indicator representing which of the nodes is included in the dropout model;

aij represents weight parameters for the respective selection indicators si and sj; and bi represents the weight parameter for the selection indicator si.

* * * * *